United States Patent
Kurtz et al.

(10) Patent No.: US 7,964,807 B2
(45) Date of Patent: Jun. 21, 2011

(54) PRESSURE SWITCH EMPLOYING SILICON ON INSULATOR (SOI) TECHNOLOGY

(75) Inventors: Anthony D. Kurtz, Saddle River, NJ (US); Joseph Van DeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 236 days.

(21) Appl. No.: 11/903,450

(22) Filed: Sep. 21, 2007

(65) Prior Publication Data

US 2009/0078547 A1   Mar. 26, 2009

(51) Int. Cl.
*H01H 9/00* (2006.01)

(52) U.S. Cl. ......................................... 200/1 B; 200/512

(58) Field of Classification Search .......... 200/512–514, 200/534, 239, 243, 600, 181, 1 B
See application file for complete search history.

(56) References Cited

U.S. PATENT DOCUMENTS

| | | | |
|---|---|---|---|
| 5,286,671 A | 2/1994 | Kurtz et al. | |
| 6,194,678 B1 * | 2/2001 | Yoshikawa et al. | 200/512 |
| 6,272,928 B1 * | 8/2001 | Kurtz | 73/721 |
| 6,639,165 B1 * | 10/2003 | Newman et al. | 200/512 |
| 6,670,562 B2 * | 12/2003 | Kaneko | 200/1 B |
| 7,178,403 B2 * | 2/2007 | Kurtz | 73/754 |
| 2001/0025778 A1 * | 10/2001 | Ono | 200/512 |
| 2007/0221488 A1 * | 9/2007 | Shin et al. | 200/513 |
| 2007/0254796 A1 * | 11/2007 | Kurtz et al. | 501/19 |
| 2009/0078547 A1 * | 3/2009 | Kurtz et al. | 200/81.4 |

* cited by examiner

*Primary Examiner* — Felix O Figueroa
(74) *Attorney, Agent, or Firm* — James E. Schutz, Esq.; Dean Y. Shahriari; Troutman Sanders LLP

(57) ABSTRACT

A pressure switch employs semiconductor silicon on insulator (SOI) technology and utilizes a first silicon wafer with a deflecting diaphragm having two metal contacts deposited thereon. Secured to the silicon wafer is a glass wafer having a central aperture defining a deflecting region. Positioned on the glass wafer is third metal contact positioned to receive the two contacts deposited on the silicon wafer when a predetermined pressure is applied. As predetermined pressure is applied, the contacts on the silicon wafer will touch the contact on the glass wafer and a connection will be made between the silicon wafer contacts to create a low impedance path between the two contacts.

11 Claims, 3 Drawing Sheets

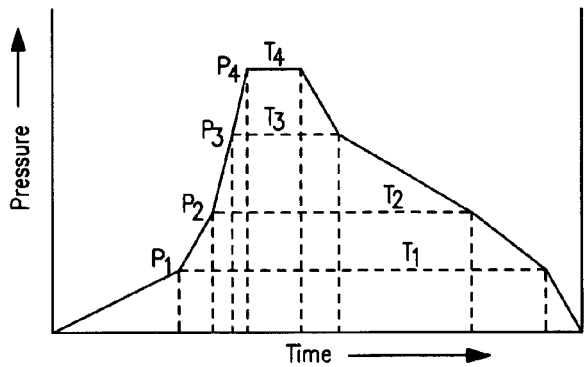
FIG. 4
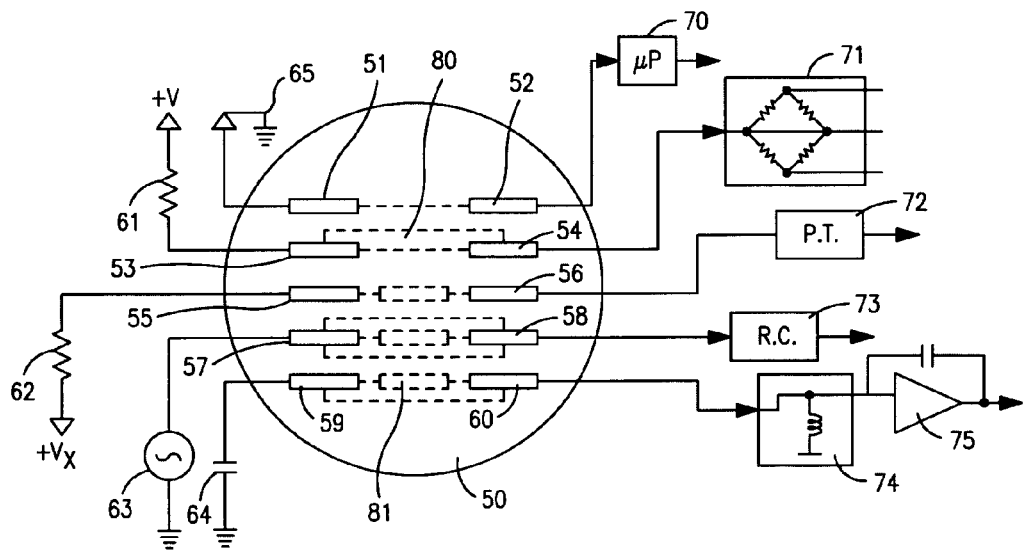
FIG. 5
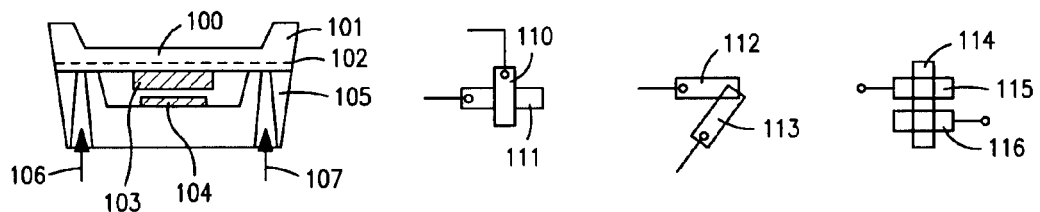
FIG. 6A  FIG. 6B  FIG. 6C  FIG. 6D

PRESSURE SWITCH EMPLOYING SILICON ON INSULATOR (SOI) TECHNOLOGY

FIELD OF THE INVENTION

This invention relates to pressure switches, in general, and more particularly to a pressure switch incorporating a deflectable silicon diaphragm.

BACKGROUND OF THE INVENTION

Pressure switches are often used to monitor an environment for pressure levels which exceed certain values. It is also advantageous to be able to monitor an environment for pressure fluctuations or spikes. In many instances, such devices are battery operated to enhance portability and maintain a relatively small size. However, a pressure sensor operating from a battery has the problem of having a relatively short battery life because the pressure sensor normally requires a continuous power flow to function. It would be desirable to utilize a pressure switch which is rugged and can operate over a wide temperature range while assuring reliable and convenient operation.

The present invention provides a pressure switch which can operate to connect an input to an output as does a normal switch. During operation of the switch, or when the switch is in the open position, the device presents an extremely high impedance and similarly when the switch is in the closed position as in conventional switches it presents an extremely low impedance. The pressure switch operates without the use of any biasing voltage and will operate in a first high impedance mode, or open mode, and a second low impedance mode or short circuit mode.

SUMMARY OF THE INVENTION

A force and pressure actuated switch, comprising: a first wafer of semiconductor material having an active area capable of deflecting upon application of a force thereto, a first and a second metal contact area positioned on the active area and separated from the other, an insulating layer secured to the semiconductor wafer and having a recess surrounding the active area and enclosing the metal contact areas, the insulating layer having a third metal contact area overlying and extending between the first and second areas, whereby when a force of a predetermined value is applied to said active area the first contact area is connected to the second via the third area due to the predetermined force causing the active area to contact the opposing surface of the glass wafer to thereby cause the contact areas to make an electrical connection.

BRIEF DESCRIPTION OF THE FIGURES

FIG. 4 is a graph of a reconstructed pressure wave using switching information provided by the switch according to an embodiment of this invention.

FIG. 5 is a schematic representation of a diaphragm employing multiple switching devices to operate various devices according to aspects of the present invention.

FIG. 6 consists of FIGS. 6A-6D and depicts alternate contact arrangements according to this invention.

DETAILED DESCRIPTION OF THE INVENTION

Figure 1:
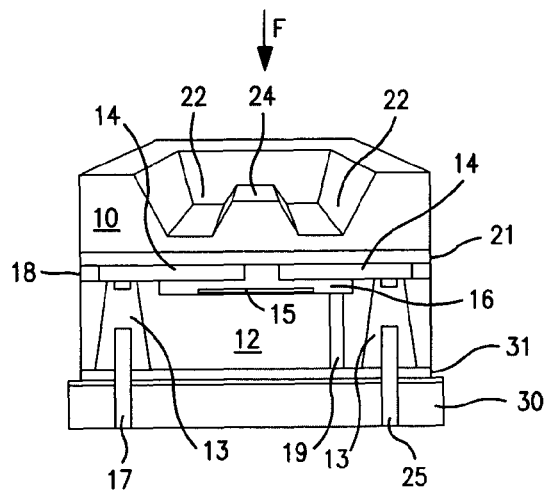
FIG. 1 is a schematic representation of a pressure switch according to an embodiment of this invention.

Referring to FIG. 1 there is shown a schematic representation of a pressure switch according to an embodiment of this invention. The pressure switch depicted has a micromachined silicon diaphragm 10 which is then fusion bonded to another silicon wafer 18. The diaphragm 10 has a layer 21 of silicon dioxide deposited thereon and has a deflecting area indicated as 22. This area is a thinned area compared with the central boss member 24 and edge or end segments and hence deflects upon application of a force (F) to the top surface of the diaphragm. The force is depicted by the letter F and the configuration depicted in FIG. 1 is a cross-sectional configuration. The diaphragm is shown as basically square but any configuration, such as circular, or any other convenient geometric configuration can be employed.

Deposited on the bottom surface of the diaphragm member 10 are two metal traces or contact areas 14. Reference numeral 14 indicates the two metal pads or traces and the same reference numeral has been employed for both. The wafer 18 is bonded to a glass pedestal or contact wafer 12. The glass pedestal wafer 12 has through holes 13 located thereon. Each through hole 13 makes contact with a respective metal trace pad 14. The through holes 13 are filled with a conductive glass metal frit so that electrical contact can be made between the header pins 17 and 25 via the metal trace members 14.

Deposited on the top surface of the glass pedestal is another metal contact area 15. The pins as 17 and 25 extend into the apertures 13 and make contact with the metal trace areas 14 during a first operation. The entire device is sealed to a metal header via a high temperature glass. The contacts can be directed through insulating layers 30 and 31 which may be glass or other insulative material. The entire device may then be bonded or otherwise secured to a header.

As depicted in FIG. 1, there is shown a deflecting area 16 formed by a depression in the glass wafer 12. The depression surrounds the active area 22. The deflecting area 16 enables the top diaphragm or silicon wafer 10 to deflect upon application of a force. If the force exceeds a predetermined value, the contacts 14 will contact the metal contact area 15 and therefore an electrical connection will be made between the two header pins 17 and 25 and the metal contact area 14 on the glass wafer 15. There is also shown a through hole or aperture 19 which can be employed if the switch is to be a gauge type switch. In any event, the aperture 19 can be removed and the deflecting area can be then sealed in a vacuum.

The silicon wafers as 10 and 18 are bonded to each other via a silicon dioxide layer 21 or may be electrostatically bonded. In a similar manner, the silicon wafer 18 is electrostatically bonded to the glass wafer 12. As indicated, the through holes 13 are filled with a conductive glass metal frit so that electrical contact is made between the header pins 17 and 25 and the metal traces 14 and 15. The spacing 16 can be controlled and by making the spacing greater or less the switch will operate at lower or higher pressures. It is also known, that the thickness of the active area 22 can be varied and this would also change the pressure or force at which the switch will operate. Thus, by making each switch as shown in FIG. 1, of a different size, an entire array of switches can be made that activate at different pressures even though they are all of the same thickness. This allows for ease of fabrication.

In a similar manner, the thickness of the contact traces 14 can be varied whereby one set of traces on the same semiconductor wafer can be of thickness different from that of another set of wafers. See FIG. 7, contact traces 14 and 14'. In this manner, as the pressure increases the first set of wafers which are the thicker set of wafers would make contact first and then the next set of traces, which would be thinner, would make contact as the pressure is increased. Thus, one can have multiple pairs of metal traces 14 of different thicknesses which will operate in sequence as the pressure increases. Similarly, one can have multiple pressure switches as shown in FIG. 1 with different thickness diaphragms as thickness 22 and therefore each of the different pressure structures would operate at a different force or for a different pressure. See FIG. 7, diaphragms 22 and 22'.

As can be seen in FIG. 1 the pressure switch depicted therein, has no operating voltage applied thereto and therefore is a completely passive device requiring no biasing voltage of any sort. It is of course understood, that based on conventional semiconductor techniques, one could fabricate a Wheatstone bridge on the same wafer whereby the Wheatstone bridge for example may be fabricated from piezoresistive components and could operate in conjunction with the wafer to measure pressure. When a predetermined pressure is reached, the Wheatstone bridge would be stopped in the sense that the pressure sensor would not respond to any greater pressures, but contacts 14 would be closed via the central contact 15 and therefore when the pressure exceeds a given pressure the switch would be activated. For all pressures beneath the given pressure, the bridge incorporated on the wafer would operate to measure pressures in a conventional well known manner. Of course if there is a Wheatstone bridge array deposited on the wafer 10 then a biasing voltage would be required. The above structure and technology is referred to as Silicon on Insulator (SOI) technology. The assignee herein Kulite Semiconductor Products, Inc., has many patents showing the technology and structures employing the same. See U.S. Pat. No. 5,286,671 entitled "Fusion Bonding Techniques for Use in Fabricating Semiconductor Devices", by A. D. Kurtz, the inventor herein and issued in 1994 and assigned to Kulite Semiconductor Products, Inc., the assignee herein.

Figure 2:
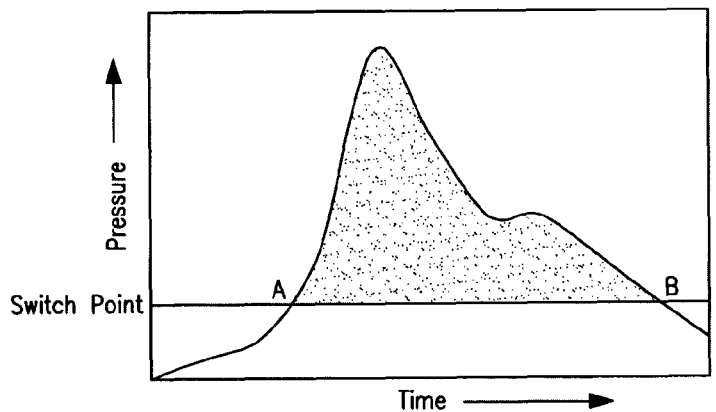
FIG. 2 is a graph depicting pressure versus time for a pressure wave to be measured.

Referring to FIG. 2 there is shown a diagram of pressure versus time depicting typical switch operation. The close contact operation of the pressure switch depicted in FIG. 1 can be used for many different purposes and in many different applications. As one can see from FIG. 2, if the application is to sense the pressure and a pressure wave, such as the pressure wave depicted in FIG. 2, then a switch can be used in two ways. It can be used to directly power a pressure sensor either on the same chip or located nearby. Thus, when the pressure level reaches a level higher than the switching point (A) the switch closes and the pressure sensor is powered. The sensor can measure the pressure shown within the shaded region before the switch reopens (B). When the switch reopens, the sensor becomes de-powered thus, the switch shown in FIG. 1 can operate to applied power to a pressure transducer which pressure transducer will begin to measure pressure at point A and continue to measure pressure until the pressure in the environment falls below point A and therefore power would be removed from the pressure sensor. The switch, as will be indicated, can also be used to trigger the interrupt of a microprocessor. The microprocessor can then turn on power to a pressure sensor to measure and record the pressure until the pressure goes below a certain arbitrary limit and the power is then turned off until the next interrupt. In this way the whole signal, after the initial trigger can be captured regardless of the level. Another way to capture more of the information is to place the pressure switch a small distance away from the pressure sensor. This can be accommodated by placing both the pressure sensor and the pressure switch on the same semiconductor wafer 10 or on two different wafers in close proximity. In this way if the pressure wave meets the switch the sensor has time to turn on before the wave reaches it. The distance needed between the switch and the sensor would be determined by the speed of sound as well as the rise time of the signal. It is of course understood that one could surround the pressure sensor with several switches so that regardless of the direction of the incoming sound wave or pressure wave, it will capture the entire signal.

Figure 3:
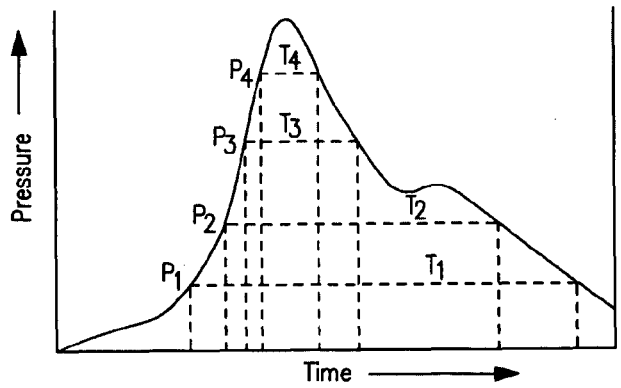
FIG. 3 is a graph of a pressure wave with switching points depicted therein.

Referring to FIG. 3 the pressure switch depicted in FIG. 1 can be placed in an array of different ranges and therefore one can measure a signal and determine the time that it stays in each range. For example, as shown in FIG. 3, there is again a graph of pressure versus time with a pressure wave similar to the one shown in FIG. 2. If one utilizes for example a plurality of different pressure switches, each of which has a different operating point based on the fact that one can change the operating point as indicated above. This can be done by controlling the thickness of the diaphragm, the area of the diaphragm or the depth of the cavity in the glass which is basically controlling the depth of distance 16 or controlling the thickness of the active area 22, as well as the size of the active area. See FIG. 7, diaphragms 22 and 22'. In this manner, four pressure switches as P1, P2, P3 and P4 can all respond to their respective pressures as indicated and one can determine the time that a pressure P1 exists which is indicated by $T_1$ and the time that the pressure P2 exists which is indicated $T_2$ and so on.

Referring to FIG. 4 there is shown the same type of diagram depicted in FIG. 3 which shows that multiple pressure switches can be used to determine the length of time each pressure exists and therefore determine the complete profile of a pressure wave. Thus, FIG. 3 shows a graph of the pressure wave with the switching points overlaid while FIG. 4 shows the reconstructed graph of the pressure wave which utilizes the switching information. There are many other uses of course that would be discerned by one skilled in the art in using such a pressure switch. The switch is ideal for any low power pressure switching applications. Because of the single crystal silicon structure, the switch will not fatigue or break even after many switching operations. There is also no hysterisis because of the structure so that the switch will continue to turn on and off at the same exact level. This is extremely important for reliable switching operations.

Referring to FIG. 5 there is generally shown a deflecting diaphragm. In FIG. 5 is basically a schematic diagram of a diaphragm 50 which is shown as a circular diaphragm, but of course can be of any geometrical shape including the square diaphragm of FIG. 1. In FIG. 5, there are shown five sets of trace contact metal areas 51-60. The trace contact sets are 51, which is associated with area 52, contact 53 is associated with contact 54, contact 55 associated with contact 56, contact 57 is associated with contact 58 and contact 59 is associated with contact 60. Each pair of contacts (e.g. contacts 51 and 52) is associated with its own center contact trace (such as trace for contacts 51 and 52); and trace 81 for contacts 59 and 60. These traces function in the manner as shown for example, by the trace 15 shown in FIG. 1.

Figure 7:
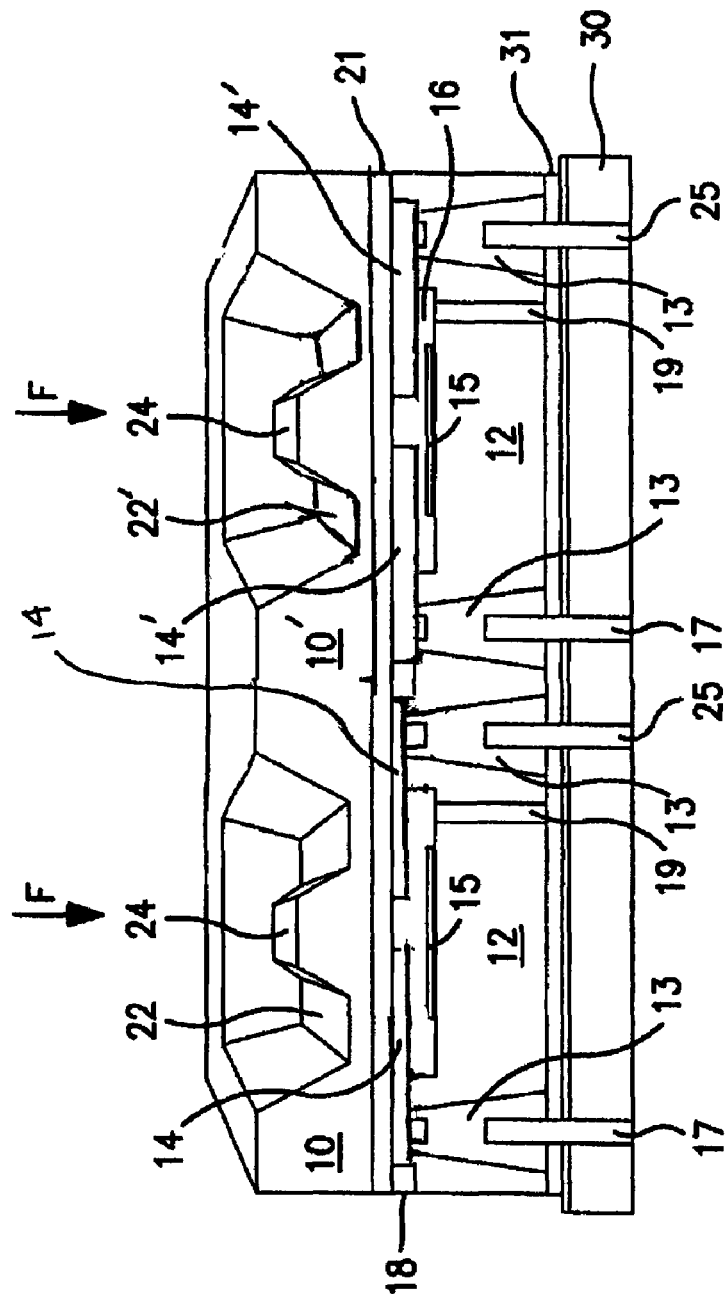
FIG. 7 is a schematic representation of a pressure switch according to an embodiment of the invention.

While there are five sets of contacts depicted on diaphragm 50 it is understood that there can be less or there can be more. There is basically no particular limitation as to the number of sets of contacts which can be employed. The contacts as indicated can have different thicknesses and therefore would close at different times or the contacts can be fabricated from different metals and therefore would also operate to provide different impedances. See FIG. 7 depicting contact trace 14 comprising a metal and contact trace 14' comprising a different metal.

In any event, the purpose of FIG. 5 is to show that multiple contacts can be placed on one diaphragm as well as the fact that the switches as in any conventional switch can be utilized for different purposes. Thus, as seen, contact 51 is connected to a ground terminal as 65, while contact 52 is connected to an input of a microprocessor 70. Thus, as the pressure increases to a certain level as for example $P_1$ contact 51 is connected to contact 52 through the metal contact area 80 and the microprocessor 70 can be operated in the interrupt mode or can be operated by the ground or operating potential furnished through contact 51.

As seen a pair of contacts 53 and 54 are associated with a pressure transducer 71 while contact 53 is connected to a biasing source through a resistor 61. Thus again, when contact 53 is connected to contact 54 at a given pressure level, the pressure transducer 71 is activated and operates to measure pressure at that point. Again, when the pressure falls below the activation pressure as for example shown in FIG. 2, the pressure transducer shuts off. In a similar manner, contacts 55 and 56 are also associated with pressure transducer 72 which receives an operating voltage (+Vx) which is a different operating voltage than (+V) and therefore when contact 55 is connected to contact 56 during a given pressure, pressure transducer 72 is operative.

It is also seen, contacts 57 and 58 are associated with a signal generator 63 which is connected to contact 57, while contact 58 is connected to a resonant or a frequency sensitive circuit 73. Thus, when contact 57 is connected to contact 58 at a given pressure the circuit 73 receives the signal 63 and may be directed to other processing circuits to provide an indication that a certain pressure has been achieved, and for example to direct the frequency signal to another circuit such as a frequency modulator or other device.

Also seen contact 59 is associated with a capacitor 64 while contact 60 is coupled to an oscillator 74 containing an inductor and amplifier 75. Thus when contact 59 is connected to contact 60 capacitor 64 is placed in parallel with inductor 74 producing a resonant circuit causing the amplifier 75 to oscillate thereby producing a frequency output when a given pressure has been reached. Thus, there is shown multiple contacts associated with a single diaphragm which of course can be employed. It is also understood that a single pair of contacts associated with a single associated trace layer as shown in FIG. 1 can be utilized, whereas a plurality of pressure switches can be provided each of a different diaphragm thickness and therefore sufficient to operate the various devices during various different modes.

Referring to FIG. 6, there is shown alternate contact configurations which can be employed with this invention. FIG. 1 and FIG. 5 illustrate examples of three contacts where contacts (such as 14 in FIG. 1) are connected together when the diaphragm impinges upon contact area 15. The configuration shown in FIG. 1 makes for a relatively easy contact arrangement. Contacts 13 are connected to header pins 17 and 25 and therefore interface with the outside world. Contact 15 has no interface with the outside world.

In any event, contact 15 may be associated with a connective contact and therefore a switch as shown in FIG. 6A can be employed. The switch shown in FIG. 6A is fabricated from the same technology as described herein and has the same format as the switch shown in FIG. 1. Essentially, there is a silicon wafer 101 which has an active deflection area 100. The deflection area 100 has deposited a layer of silicon dioxide 102 thereon and is bonded to a glass contact wafer 105. The glass contact wafer 105 has header pins 106 and 107.

Secured to the active area is a first contact area 103. The contact area 103 may be a metal disposed in the active area or deflection area 100 and underlies a metal contact area 104 which is disposed on the glass. Thus, when the diaphragm wafer 101 deflects, contact is now made between contact areas 103 and 104. This causes a low impedance to occur between contacts 103 and 104 and operates as a single throw switch.

Shown in FIG. 6B are contacts 110 and 111 which are reflectively disposed upon the silicon wafer and the glass wafer and which are transverse to each other. FIG. 6 C shows contacts 112 and 113 which are respectively positioned on the semiconductor wafer and the glass wafer and which are disposed at angles to one another. FIG. 6D shows contact areas 115 and 116 which for example would be deposited on the active region of the semiconductor wafer while contact 114 which is transverse to these contacts would be positioned on the glass wafer.

As illustrated in FIG. 6, in numerous variations of switch configurations or contact configurations exist which can be used in conjunction with the present invention without departing from the spirit and scope thereto and which operate to furnish a pressure sensitive switch requiring no operating power whereby contact or switch closure is implemented by the impingement of the deflecting area of a pressure switch upon the glass surface of the contact wafer of the pressure switch.

It is of course simply understood and indicated that the device depicted in FIG. 1 and the devices discussed herein are and do operate as a conventional switch such as the switch found in the home to turn on and off a light or a lamp or any switch. However, they are pressure actuated. The devices have an extremely high impedance or open circuit during the first mode and an extremely low impedance or short circuit during the second mode, as does a conventional switch. The devices depicted are rugged as they are fabricated from silicon and they operate without any biasing voltage to be applied. They are capable of handling large currents as a pure function of the thickness and size of the metal layers which are connected together during switch operation. The switches can of course be extremely small as they are manufactured by typical semiconductor techniques as for example MMIC and SOI technology. The switches, as indicated are basically leadless devices in the sense that there are no output wires associated with the devices but they only have the terminal pins as 17 and 25 associated therewith.

It is of course understood that if there are multiple pairs of contacts as depicted in FIG. 5 located on one diaphragm, then there are many more terminal pins which would have to be provided. It is of course understood that a plurality of switches such as those depicted in FIG. 1 can be placed on one silicon chip and by making each switch of a different size, an array of switches can be made that activate at different pressures even though they are all of the same thickness allowing for extremely simple fabrication.

Thus, a pressure switch employs semiconductor silicon on insulator (SOI) technology and utilizes a first silicon wafer which has a deflecting diaphragm. Deposited on the wafer is at least one distinct metal contact. Secured to the semiconductor wafer is a glass wafer having a central aperture defining a deflecting region. Positioned on top of the glass wafer is another metal contact which is positioned to receive the two contacts deposited on the silicon wafer when a given pressure is applied to the silicon wafer. The metal contact on the silicon wafer is connected to a header pin, via apertures formed in the glass wafer, the apertures are filled with a conductive glass metal frit so that contact is made between the header pins and the metal contacts deposited on the silicon wafer. Operation is such that when a pressure is applied of a given magnitude the contact on the silicon wafer will contact the metal contact trace on the glass wafer and therefore a connection would be made between the first metal trace and the second metal trace to create a low impedance path between the two tracers thereby connecting the first trace on the silicon wafer to the second trace on the glass wafer. This creates a high impedance or open circuit in a first state and when the pressure exceeds the threshold a slow impedance or short circuit in a second state.

It is thus indicated that one skilled in the art will find multiple uses for such switches many of which have not been depicted herein but will be easily ascertainable by one skilled in the art. It is further understood that many different embodiments can be encompassed to provide different operations such as providing metal layers of different thicknesses as well as metal layers of different metals and hardeners to provide different results. It is thus indicated that all such alternative configurations and embodiments are encompassed within the scope and spirit of the claims appended hereto.

What is claimed is:

1. A force actuated switch, comprising:
   a first wafer of semiconductor material having an active area capable of deflecting upon application of a force thereto;
   a first and a second metal contact areas positioned on said active area and separated one from the other;
   an insulating layer secured to said semiconductor wafer and having a recess surrounding said active area and enclosing said metal contact areas, said insulating layer having a third metal contact area overlying and extending between said first and second metal contact areas, whereby when a force of a predetermined value is applied to said active area said first metal contact area is connected to said second metal contact area via said third metal contact area due to said predetermined force causing said deflection area to curve toward the insulating layer;
   a fourth and a fifth metal contact areas located on said deflecting areas of said semiconductor wafer and separate from said first and second metal contact areas and a sixth metal contact area positioned on said insulating layer and disposed between said fourth and fifth metal contact areas and separated from said third metal contact area to cause said fourth and fifth metal contact areas to make electrical contact via said sixth metal contact area when said predetermined force is applied, wherein said first and second metal contact areas are fabricated from a different conductive metal than said fourth and fifth metal contact areas.

2. The switch according to claim 1, wherein said first and second metal contact areas have a different thickness than said fourth and fifth metal contact areas.

3. The switch according to claim 1, further including an aperture formed in said insulating layer and extending from one surface of said layer into said recess to enable said pressure switch to operate as a gauge switch.

4. The switch according to claim 1, further including a second semiconductor wafer being of an annular configuration and fusion bonded to said first wafer to form a peripheral sealing ring about the periphery of said first wafer and surround said active area.

5. The switch according to claim 1, wherein said semiconductor material is silicon.

6. The switch according to claim 5, wherein said insulating layer is glass.

7. The switch according to claim 6, where said semiconductor wafer is secured to said glass wafer by an electrostatic bond.

8. The switch according to claim 1, further including a first aperture formed in said insulating layer and coacting with said first metal contact area and a second aperture formed in said insulating layer and coacting with said second metal contact area, a conductive material deposited in said first and second apertures to make conductive contact with said respective contact areas.

9. The switch according to claim 8, further including a first conductive pin located in said first aperture and in contact with said conductive material and a second conductive pin located in said second aperture and in contact with said conductive material whereby when electrical contract is made between said first and second contact areas electrical contact is made between said first and second pins.

10. The switch according to claim 8, wherein said conductive material is a conductive glass metal frit.

11. The switch according to claim 1, wherein said first and second metal contact areas are of a different thickness than said third metal contact area.

* * * * *